United States Patent [19]

Kwoh

[11] Patent Number: 5,290,973
[45] Date of Patent: Mar. 1, 1994

[54] ACOUSTIC DAMPING DEVICE

[76] Inventor: Frederick Y. S. Kwoh, 1/F, Unit 1, Shui Hing Centre, 13, Sheung Yuet Road, Kowloon Bay, Kowloon, Hong Kong

[21] Appl. No.: 934,564

[22] Filed: Aug. 24, 1992

[51] Int. Cl.⁵ .............................................. A47B 41/06
[52] U.S. Cl. .................................... 181/199; 181/207
[58] Field of Search ............... 181/199, 207, 208, 209, 181/151, 153, 294; 381/88, 90; 248/580, 619

[56] References Cited

U.S. PATENT DOCUMENTS

| | | | |
|---|---|---|---|
| 3,578,103 | 5/1971 | Lennes | 181/151 |
| 3,944,757 | 3/1976 | Tsukamoto | 181/151 |
| 4,924,964 | 5/1990 | Olsen | 181/151 |
| 4,957,184 | 9/1990 | Negishi | 181/199 X |

FOREIGN PATENT DOCUMENTS 1293391 10/1972 United Kingdom .
8500203 12/1985 World Int. Prop. O. .

Primary Examiner—Michael L. Gellner
Assistant Examiner—Khanh Dang
Attorney, Agent, or Firm—Lyon & Lyon

[57] ABSTRACT

An acoustic damping device having a hollow cone partially filled with an acoustic damping medium. The cone is composed of solid material such as wood. The acoustic damping medium can be a particulate solid, such as metal powder, or a liquid. The acoustic damping device is placed between a speaker and a speaker platform to reduce the amount of vibrational interference that reaches the speaker.

23 Claims, 1 Drawing Sheet

ACOUSTIC DAMPING DEVICE

BACKGROUND OF THE INVENTION

The field of the present invention is acoustic damping devices. Loudspeakers have experienced great improvement in frequency response, but that response has been limited by both internally and externally .generated vibrations. Vibration absorbers or drains for reducing vibrational interference have been solid or hollow shapes, which are placed between the speaker and the speaker platform. Although these devices may dampen vibrations well, their dampening or dissipation depends on frequency, and they provide a non-uniform frequency response. In addition, they tend to reflect or redirect some vibrations back into the audio equipment.

SUMMARY OF THE INVENTION

The present invention is directed to a speaker acoustic fidelity improvement device. To this end, one or more of the acoustic damping devices are placed between a speaker and the speaker platform, contacting both the speaker and the platform. The acoustic damping device is at least partially filled with an acoustic damping medium.

Accordingly, it is an object of the present invention to provide an improved acoustic damping device. Other and further objects and advantages will appear hereinafter.

DETAILED DESCRIPTION OF THE PREFERRED EMBODIMENTS

Figure 1:
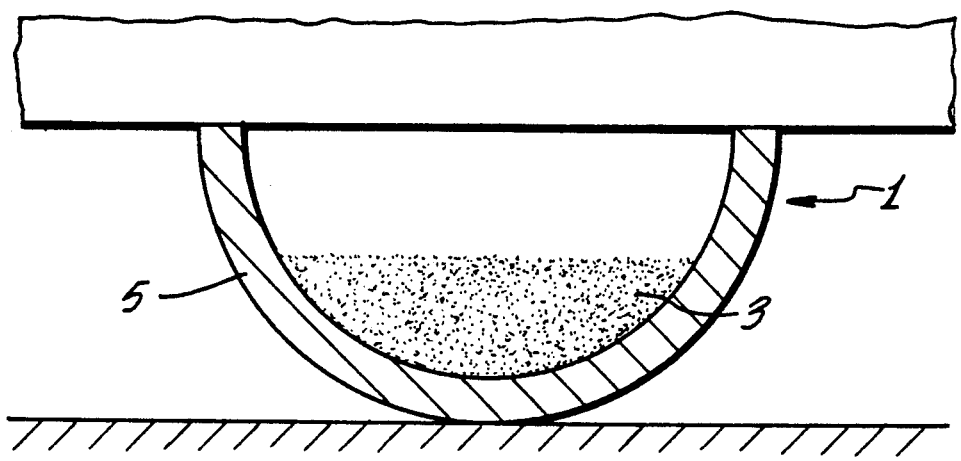
FIG. 1 is a section view of the present device, placed as it would be placed during use.
Figure 2:
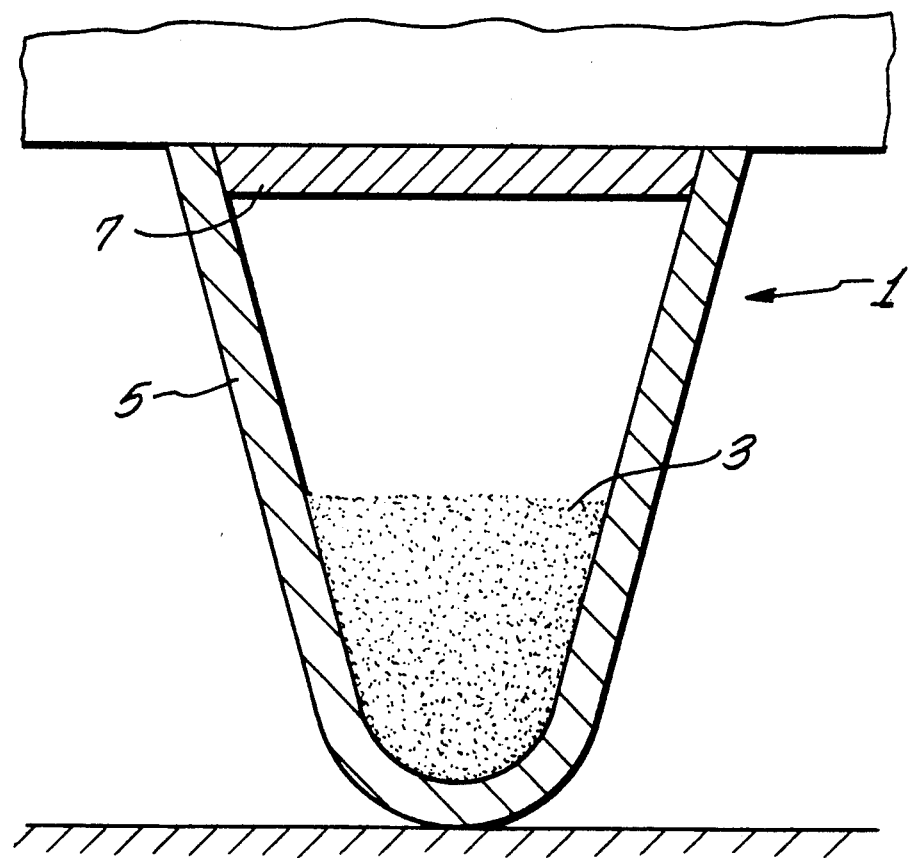
FIG. 2 is a section view of an alternative embodiment of the present device placed as it would be placed during use.

Turning in detail to the drawings, the acoustic damping device 1, as illustrated in FIGS. 1 and 2, rests between the base of the speaker and a platform such as a table or floor.

The acoustic damping medium 3 is encased entirely within the shell 5 of the acoustic damping device. The shell 5 is made of a solid material such as wood, metal, or porcelain. Hard rubber or plastic can also be used, but are less effective. At the top of the acoustic damping device 1, the diameter of the shell 5 is typically between 1 inch and 4 inches. Preferably, the shell 5 is a hemisphere of wood with a non-uniform wall thickness, 2.0 inches in diameter (at the top, and filled between 20% and 80% with copper powder.

The acoustic damping medium 3 is any of a variety of materials including particulate solids such as sand, metal powder, gravel, wood chips, or porcelain as well as liquids. Preferably, the damping medium 3 is a material with good thermal transfer characteristics. The damping medium 3 converts vibrational energy into thermal energy and dissipates the thermal energy as radiated heat. The shell 5 may be hemispherical, conical or another shape, including shapes whose cross-sections, perpendicular to the axis that runs from the platform to the speaker, are not circular. Such geometries include elliptical cross-sections.

The acoustic damping device in FIG. 2 has a cover 7 attached to or on the top of the shell 5. The cover 7 may or may not be composed of the same material as the shell 5. The cover 7 prevents the acoustic damping medium 3 from spilling out of the shell 5.

Thus, an acoustic damping device is disclosed which improves the acoustic fidelity of speakers. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An acoustic damping device for supporting a speaker cabinet above a platform, comprising
   a shell of solid material having a generally flat top surface for contacting the speaker cabinet and a rounded bottom surface for contacting the platform; and
   an acoustic damping medium at least partially filling said shell.

2. The acoustic damping device defined in claim 1 wherein said shell is shaped as a hemisphere.

3. The acoustic damping device defined in claim 1 wherein said shell is proportioned such that the base of the shell has a smaller circumference than the top of the shell and the circumference of said shell continuously increases from the base to the top of the shell.

4. The acoustic damping device defined in claim 1 wherein said shell has a base with a perimeter smaller than the perimeter of the top.

5. The acoustic damping device defined in claim 1 wherein said shell has a non-uniform thickness.

6. The acoustic damping device defined in claim 1 wherein said acoustic damping medium is sand.

7. The acoustic damping device defined in claim 1 wherein said acoustic damping medium is metal powder.

8. The acoustic damping device defined in claim 1 wherein said acoustic damping medium is wood chips.

9. The acoustic damping device defined in claim 1 wherein said acoustic damping medium is gravel.

10. The acoustic damping device defined in claim 1 wherein said acoustic damping medium is porcelain.

11. The acoustic damping device defined in claim 1 wherein said acoustic damping medium is a granular material.

12. The acoustic damping device defined in claim 1 wherein said acoustic damping medium is a powder.

13. The acoustic damping device defined in claim 1 wherein said acoustic damping medium is a liquid.

14. The acoustic damping device defined in claim 1 wherein said shell is ¾ filled with the acoustic damping medium.

15. The acoustic damping device defined in claim 1 wherein said shell is ½ filled with the acoustic damping medium.

16. The acoustic damping device defined in claim 1 wherein said shell is ¼ filled with the acoustic damping medium.

17. The acoustic damping device defined in claim 1 wherein said shell comprises wood.

18. The acoustic damping device defined in claim 1 wherein said shell comprises metal.

19. An acoustic damping device for supporting a speaker cabinet above a platform, comprising
    a shell of solid material having a generally flat top surface for contacting the speaker cabinet and a rounded bottom surface for contacting the platform;

an acoustic damping medium at least partially filling said shell; and a cover attached to said shell.

20. The acoustic damping device of claim 19 wherein the shell comprises a single piece of wood.

21. An acoustic damping device for supporting a speaker cabinet above a platform, comprising a hemispherical shell of solid material having a circular cross-section taken perpendicular to an axis extending from the speaker cabinet to the platform, a generally flat top surface for contacting the speaker cabinet, and a non-uniform wall thickness; and an acoustic damping medium filling at least ¼ of the shell.

22. The acoustic damping device of claim 21 wherein the hemispherical shell comprises a single piece of wood.

23. The acoustic damping device of claim 21 further comprising a cover attached to the hemispherical shell.

* * * * *

UNITED STATES PATENT AND TRADEMARK OFFICE
CERTIFICATE OF CORRECTION

PATENT NO. : 5,290,973

DATED : March 1, 1994

INVENTOR(S) : Frederick Y.S. Kwoh

It is certified that error appears in the above-identified patent and that said Letters Patent is hereby corrected as shown below:

In column 1, line 33, move the final semicolon in front of the word "and".

In column 1, line 52, before the comma insert --rim)--.

Signed and Sealed this

Second Day of August, 1994

Attest:

BRUCE LEHMAN

*Attesting Officer*     *Commissioner of Patents and Trademarks*